United States Patent [19]

Reichow

[11] 4,160,607
[45] Jul. 10, 1979

[54] HINGE JOINTS FOR ELONGATED COLLAPSIBLE MEMBERS SUCH AS A FISHING ROD

[76] Inventor: James R. Reichow, 2912 82nd Cir. North, Brooklyn Park, Minn. 55444

[21] Appl. No.: 842,492

[22] Filed: Oct. 17, 1977

[51] Int. Cl.² .............................................. F16B 7/10
[52] U.S. Cl. .................................... 403/286; 403/100; 43/18 R; 16/150; 403/123
[58] Field of Search ............... 403/220, 102, 100, 123, 403/286, 287, 291, 223, 293; 43/18 R, 18 GF; 16/DIG. 13, 150; 135/74; 308/2 A

[56] References Cited

U.S. PATENT DOCUMENTS

| Re. 28,706 | 7/1974 | Hyman | |
| 499,779 | 6/1893 | Cable | |
| 692,884 | 2/1902 | Lyon | 43/18 R |
| 719,603 | 2/1903 | McNamee | |
| 1,893,396 | 1/1933 | Bullough | |
| 1,982,910 | 12/1934 | Forbes et al. | 403/100 |
| 2,311,355 | 2/1943 | Thornquist | |
| 2,535,548 | 12/1950 | Porter | |
| 2,600,629 | 6/1952 | Feierabend | 43/18 R X |
| 2,902,789 | 9/1959 | Mehr | 43/18 |
| 3,019,486 | 2/1962 | Stinson | 160/231 A |
| 3,036,398 | 5/1962 | Gagner | 43/18 R |
| 3,133,549 | 5/1964 | Severing | |
| 3,245,169 | 4/1966 | Kennel | 43/18 |
| 3,326,268 | 6/1967 | Dixon | 160/231 A |
| 3,445,052 | 5/1969 | Lewallen | 16/DIG. 13 |
| 3,448,748 | 6/1969 | Walgrave | |
| 3,460,282 | 8/1969 | Swirsky | 160/231 A X |
| 3,635,233 | 1/1972 | Robertson | |
| 3,730,544 | 5/1973 | Hyman | |
| 3,834,410 | 9/1974 | Leibel | |
| 3,947,141 | 3/1976 | Casset | 43/18 R |

FOREIGN PATENT DOCUMENTS

| 196083 | 2/1958 | Australia | 135/74 |
| 1033233 | 6/1966 | United Kingdom | 16/DIG. 13 |

Primary Examiner—Andrew V. Kundrat
Attorney, Agent, or Firm—Dorsey, Windhorst, Hannaford, Whitney & Halladay

[57] ABSTRACT

A collapsible and lockable hinge joint for elongated members such as a fishing rod. The embodiment disclosed utilizes a unitary, flexible, non-elastic hinge formed of polypropylene which is slotted into ferrules which are attached to adjacent segments of the rod. The junction is preferably completed with the use of a flexible coupling sleeve which slides over the joint. In this manner the entire rod is flexible when in use and does not contain a dead spot at the joint. For use as a fishing rod the segments of the rod can be folded together and clipped for easy storage and transportation.

11 Claims, 5 Drawing Figures

U.S. Patent  Jul. 10, 1979  4,160,607
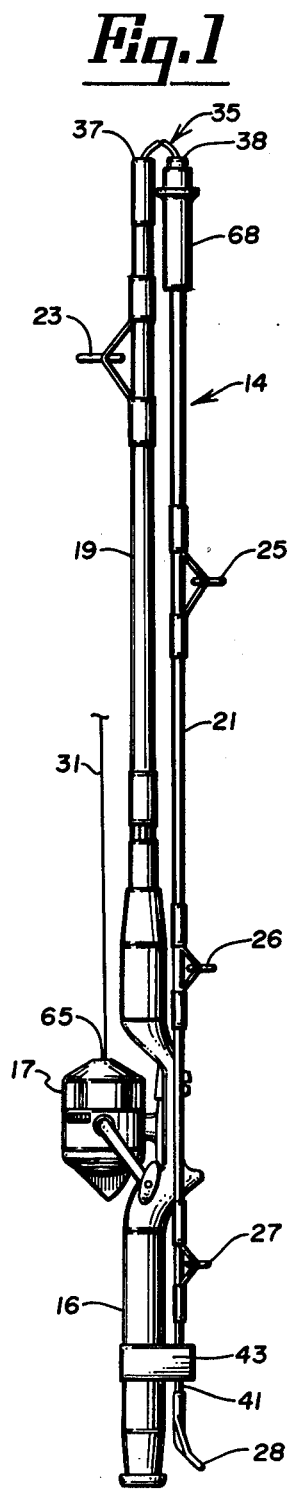
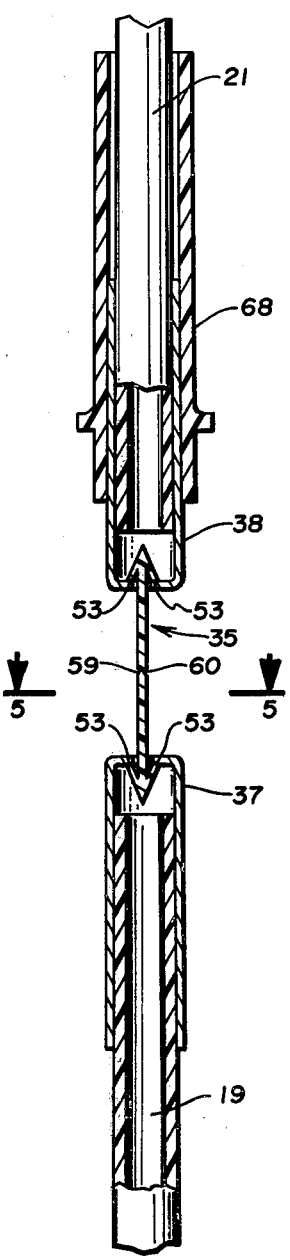
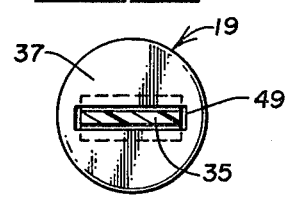
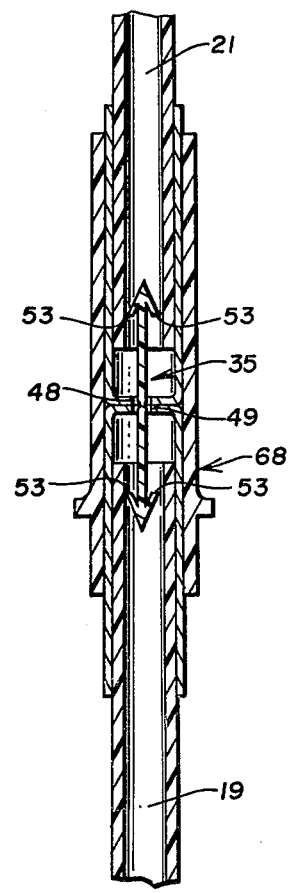
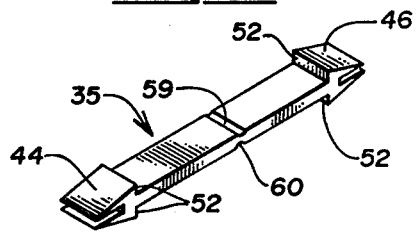

HINGE JOINTS FOR ELONGATED COLLAPSIBLE MEMBERS SUCH AS A FISHING ROD

BACKGROUND OF THE INVENTION

Elongated members are useful as fishing rods, ski poles, tent poles and the like. The problem of transporting and storing such rods or other elongated members, which are awkward and unwieldly in their assembled state, and parts for which are easy to misplace when disassembled, has been a long-existent problem and one to which a certain amount of inventive ingenuity has been applied.

In the art generally are three types of hinges for collapsible members: hinges which employ mechanical linkages, hinges or springs to join separate segments of the rod or pole (i.e., metallic or other rigid structures which are attached to and a part of the rod or pole), hinges which employ a resilient or tensible cord or spring or other material along or within the entire length of the member, some requiring a mechanism to apply tension to the cord; and hinges which employ elastic or elastomeric material to join separate segments of the rod or pole.

These mechanisms of the past while suitable to perform the function intended are not particularly adapted to the environment in which such elongated members are used. If the elongated member is a fishing rod having its segments joined by such hinges, or a ski pole or tent pole, wind, rain, constant exposure to air and, in the case of fishing equipment, exposure to salt water, gasoline and oil causes such hinging mechanisms to deteriorate and decompose leading to failure of the hinge mechanism.

SUMMARY OF THE INVENTION

The present invention is a hinge mechanism which is inexpensively constructed, easily manufactured, and virtually indestructible, thus being extremely dependable in use. It is a hinge mechanism for elongated members which is specifically designed for and well adapted to be used in an environment where nature's elements are prevalent as well as corrosive materials such as salt water, gasoline, and other hydrocarbon or petrol products.

In the preferred embodiment discussed below the invention is shown as used with a fishing rod. The basic hinge mechanism is formed as a single strip of non-elastomeric material such as polypropylene with an elongated shape having a geometric, non-circular cross section. On each end of the hinge are hinge and means to enable the ends of the hinge to be forced into corresponding ends of segments of the elongated member and to prevent accidental removal from the segments. The material is preferably creased at the center of the longitudinal axis to facilitate flexing of the hinge and the hinge mechanism is preferably enclosed by a flexible sliding ferrule constructed of a material similar to that of the hinge so that the joined section is as flexible or rigid as the assembled rod or member.

In this manner, an extremely dependable hinge joint can be created which is virtually indestructible and as dependable as the elongated rod with which the hinge is utilized. Other objectives and advantages of the present invention will become apparent from a consideration of the following description in connection with the drawings.

DESCRIPTION OF THE DRAWINGS

FIG. 1 is a plan view of a segmented fishing rod utilizing the present invention.

FIG. 2 is a longitudinal cross section of a ferrule connection of a fishing rod utilizing the invention wherein the segments of the fishing rod are separated by the length of the flexible hinge.

FIG. 3 is also a longitudinal cross section wherein the segments are joined and a sliding ferrule connection is slid over the joined segments.

FIG. 4 is a perspective view of the flexible hinge; and

FIG. 5 is an end view of one of the segments taken along the line 5—5 in FIG. 2 showing how each segment is slotted to receive the geometric non-circular cross section of the hinge which, as explained below, provides and allows for self-alignment of the rod when assembled.

DESCRIPTION OF THE PREFERRED EMBODIMENT

FIG. 1 shows a conventional fishing rod 14 having a handle 16, a reel 17 attached to the handle 16 and two segments 19, 21, each of which have line guides 23 and 25-28 suitable for holding the fishing line 31. As shown in FIG. 1 the flexible hinge 35 of the present invention joins the contiguous ends 37, 38 of the two segments 19, 21 of the rod. As should be obvious, more than two segments could easily be provided and joined in a manner similar to that shown in the drawing. The end 41 of the rod 14 may also be conveniently clipped to the handle 16 with a suitable clip 43 to form a compact assembly for transportation or storage of the disassembled rod 14.

As shown most clearly in FIG. 4 the flexible hinge 35 is generally elongated in shape with a geometric non-circular cross section. At each end of the hinge, hinge end means in the form of tapered protrusions 44, 46 are provided which permit the hinge to be forced into slots 48, 49 in the ends 37, 38 of the segments 19, 21 but with inwardly facing surfaces 52 or tabs 53 which prevent the hinge 35 from being easily removed therefrom. Preferably, however, the end protrusions 44, 46 are constructed so that with sufficient force the hinge 35 may be removed from the segments 19, 21 in the event that replacement is ever desired or necessary.

The flexible hinge 35 is preferably molded as a single piece from a plastic material such as polypropylene which is non-metallic and non-elastic creating a flexible hinge which is environmentally stable and thus impervious to water, oil, gasoline, sunlight, and other forms of ultraviolet light, or salt water. It has also been found advantageous to notch a crease 59, 60 in the hinge 35 transversely, at the approximate longitudinal midpoint of the hing 35. The crease 59, 60 facilitates flexing of the hinge 35.

As shown most clearly in FIG. 5 the end segments 37, 38, which may be brass commonly associated with fishing rods or the material of the member itself if the invention is to be used with a ski pole, tent pole or the like, are preferably slotted or apertured 48, 49 with a geometric cross section which is similar to that of the flexible hinge 35 and of sufficient size to allow the end protrusions 44, 46 to be forced into and held by the apertures 48, 49 in the ends 37, 38 of the segments 19, 21. The compatible cross section permits the flexible hinge 35 to align the elongated member 14 in a proper relationship. For example, as is obvious from FIG. 1, when assembled, the eyelets or line guides 23, 25-28 of the fishing rod 14 will be aligned with each other and with the line opening 64 of the reel 17.

As shown in FIGS. 2 and 3, when assembled with the contiguous ends 37, 38 of the segments 19, 21 adjoining each other a sliding ferrule connection 68 is preferably provided to lock the members 19, 21 one to the other. The sliding ferrule connection 68 is also preferably molded from polypropylene so that the fishing rod 14 will flex throughout its entire length when used and will not have the "dead spot" typical of fishing rods which use a metallic ferrule connection and force fit the segments together.

However, as is more conventional in the art, the ferrule connection 68 may be affixed directly to one of the segments 21 with sufficient taper so that the second segment 19 can be force fit into the ferrule connection 68. With the fixed ferrule connection 68 the flexible hinge 35 still performs the intended function of joining the segments 19, 21. However, the length of the hinge 35 must be sufficient to allow it to flex around the edge of the fixed ferrule 68.

The resulting fishing rod 14 is one that is extremely durable in use, is easily disassembled for storage or transportation, and is self aligned when assembled due to use of the non-elastic material of the hinge 35.

From a consideration of the foregoing disclosure it should be obvious that the invention is a simply constructed and economically manufactured mechanism which is not susceptible to the disadvantages of the prior art. It should be understood that modifications and variations may be resorted to without departing from the spirit of the invention as those skilled in the art will readily understand. Such modifications and variations are considered to be within the purview and scope of the present invention as defined by the following claims:

I claim:

1. In a collapsible elongated member having at least two segments, each of the segments having at least one receiving end, the receiving end having an opening confined entirely therein, an improved hinge joint comprising:

retention means for holding two segments in a substantially contiguous, linear relationship to each other so as to form an assembled member with a receiving end from one of the segments abutting a receiving end from the other segment;

a unitary, nonelastic, flexible hinge formed from an environmentally stable material, the hinge having an elongated central portion between two ends; and hinge end means integrally formed as part of the hinge ends, the hinge end means securing each end of the hinge to a receiving end of each of the two segments and being freely movable within that portion of the segment adjacent the receiving ends.

2. The improvement of claim 1 wherein
the hinge is molded to have a noncircular cross section; and
the opening in the receiving end is an aperture having the same noncircular cross section as the hinge so that the segments are aligned with each other upon assembly.

3. The improvement of claim 2 wherein the hinge end means comprises compressible tapered protrusions on each end of the hinge constructed so that the hinge may be inserted and removed from the aperture of the segment receiving ends.

4. The improvement of claims 1 or 2 wherein the hinge end means is removably secured to a receiving end of each of the two segments so that the hinge may be replaced in the event of failure.

5. The improvement of claim 1 wherein the retention means comprises a sleeve mounted near a receiving end of one of the two segments and into which a receiving end of the other segment is secured.

6. The improvement of claim 7, wherein the sleeve is flexible so that flexing of the assembled member includes flexing of the sleeve.

7. The improvement of claim 5 wherein the sleeve is slidably mounted so that the two segments may be aligned and the sleeve slid into place to assemble the collapsible elongated member and to lock the two segments together.

8. The improvement of claim 7 wherein the sleeve is substantially shorter than the segment to which it is slidably mounted.

9. The improvement of claim 1 wherein the hinge is molded from a plastic material impervious to gasoline, water, ultraviolet light and sunlight.

10. The improvement of claim 1 wherein the hinge is molded from polypropylene.

11. The improvement of claim 3 wherein
the retention means comprises a flexible sleeve mounted near a receiving end of one of the two segments and into which a receiving end of the other segment is secured, the sleeve being slidably mounted so that the two segments may be aligned and the sleeve slid into place to assemble the collapsible elongated member and to lock the two segments together, the sleeve being substantially shorter than the segment to which it is mounted; and
the hinge is molded from a plastic material impervious to gasoline, water, ultraviolet light and sunlight.

* * * * *